United States Patent [19]

Suzuki et al.

[11] 4,403,317
[45] Sep. 6, 1983

[54] AUTOMATED DISK MOUNT ASSEMBLY

[75] Inventors: Hiroyuki Suzuki; Masayuki Taoka; Kiyoshi Watanabe, all of Higashihiroshima, Japan

[73] Assignee: Sharp Kabushiki Kaisha, Osaka, Japan

[21] Appl. No.: 256,112

[22] Filed: Apr. 21, 1981

[30] Foreign Application Priority Data

Apr. 22, 1981 [JP] Japan .................................. 56-2811

[51] Int. Cl.³ .......................... G11B 1/00; G11B 17/04
[52] U.S. Cl. ..................................... 369/75; 369/191; 369/194; 369/270
[58] Field of Search .................... 369/77, 75, 270, 191, 369/194

[56] References Cited

U.S. PATENT DOCUMENTS 1,942,864 1/1934 LaRue .................................. 369/191
2,780,465 2/1957 Carlson ............................... 369/191
3,561,768 2/1971 Castagna ............................. 369/270
4,123,065 10/1978 Watanabe ............................ 369/77

FOREIGN PATENT DOCUMENTS 56-11651 2/1981 Japan .................................. 369/191

Primary Examiner—Steven L. Stephan
Attorney, Agent, or Firm—Birch, Stewart, Kolasch & Birch

[57] ABSTRACT

There is disclosed a disk mount assembly for a disk player with a turntable and a front cover, especially for use in a vertical player. The disk mount assembly includes a disk mount so disposed in front of the turntable as to be movable upon opening or closing the front cover. A disk is first placed on the disk mount and brought into contact with the turntable upon closure of the front cover. Preferably, the disk mount bears an EP record disk mounting recess and an LP record disk mounting recess which are axially displaced on different levels with respect to each other.

9 Claims, 7 Drawing Figures

AUTOMATED DISK MOUNT ASSEMBLY

BACKGROUND OF THE INVENTION

This invention relates to an automated disk mount assembly and more particularly to an automated disk mount assembly for use in a record disk player resting in a vertical direction by which a record disk is easily mounted on a turntable.

One prior art record player of the above mentioned sort is illustrated in a schematic view in FIG. 1 showing the appearance thereof. When mounting a record disk 2 on a turntable 1 is desirable, the disk 2 is first mounted in a provisional position on the turntable 1 for a brief period of time while a central opening 2a of the disk 2 is brought into alignment with a spindle 1a on the turntable 1. A disk holder 4 which is rotable on a body 3 of the player is then rotated in the direction of the arrow A into engagement with the spindle 3a so that the record disk 2 may be secured tightly under pressure on the turntable 1. However, for the above player, it is impossible to fit the spindle 1a into the central opening 2a of the disk through utilization of the gravity of the disk as experienced in the conventional record player resting in a horizontal direction. Thus, the vertical player requires a careful and delicate procedure for supporting the record disk 2 in a vertical direction and fitting the central opening 2a onto the spindle 1a. Therefore, the record disk 2 is in danger of being dropped. Very careful attention is therefore needed in mounting the disk.

OBJECTS AND SUMMARY OF THE INVENTION

Accordingly, it is an object of the present invention to provide an automated disk mount assembly which overcomes the above problems with the mounting of disks on the prior art device.

It is another object of the present invention to provide an automated disk mount assembly by which a disk is mounted under pressure on a turntable due to engagement between a central opening of the disk and a spindle of the turntable when the disk is first placed on a disk mount movable both forwardly and backwardly with respect to the turntable in response to movement of a front cover and the front cover is then brought into the closed position.

In accordance to a preferred embodiment of the present invention, there is provided a disk mount assembly for a disk player with a turntable and a front cover, comprising a disk mount so disposed in front of the turntable as to be movable upon opening or closure of the front cover, wherein a disk is first placed on the disk mount and brought into contact with the turntable in association with the closure of the front cover.

BRIEF DESCRIPTION OF THE DRAWINGS

For a more complete understanding of the present invention and for further objects and advantages thereof, reference is now made to the following description taken in conjunction with the accompanying drawings showing an automated disk mount assembly for use in a disk player in accordance with an embodiment of the present invention, in which.

DETAILED DESCRIPTION OF THE INVENTION

Figure 1:
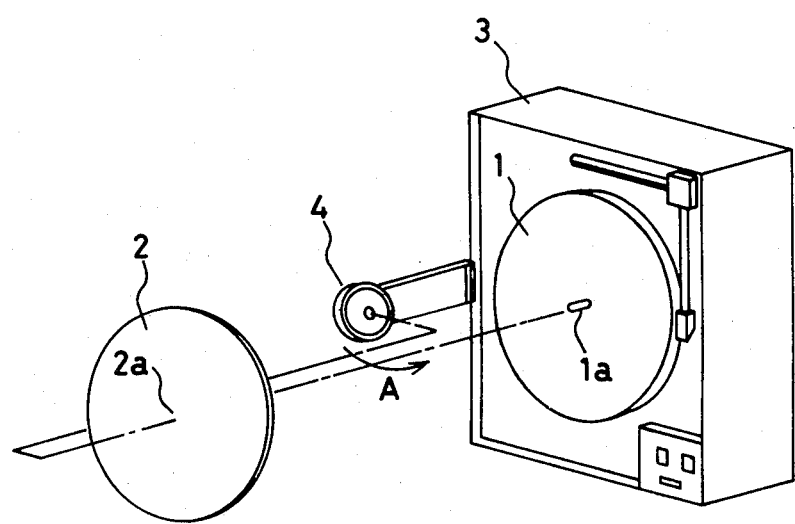
FIG. 1 is a perspective view of a prior art vertical disk player.
Figure 2:
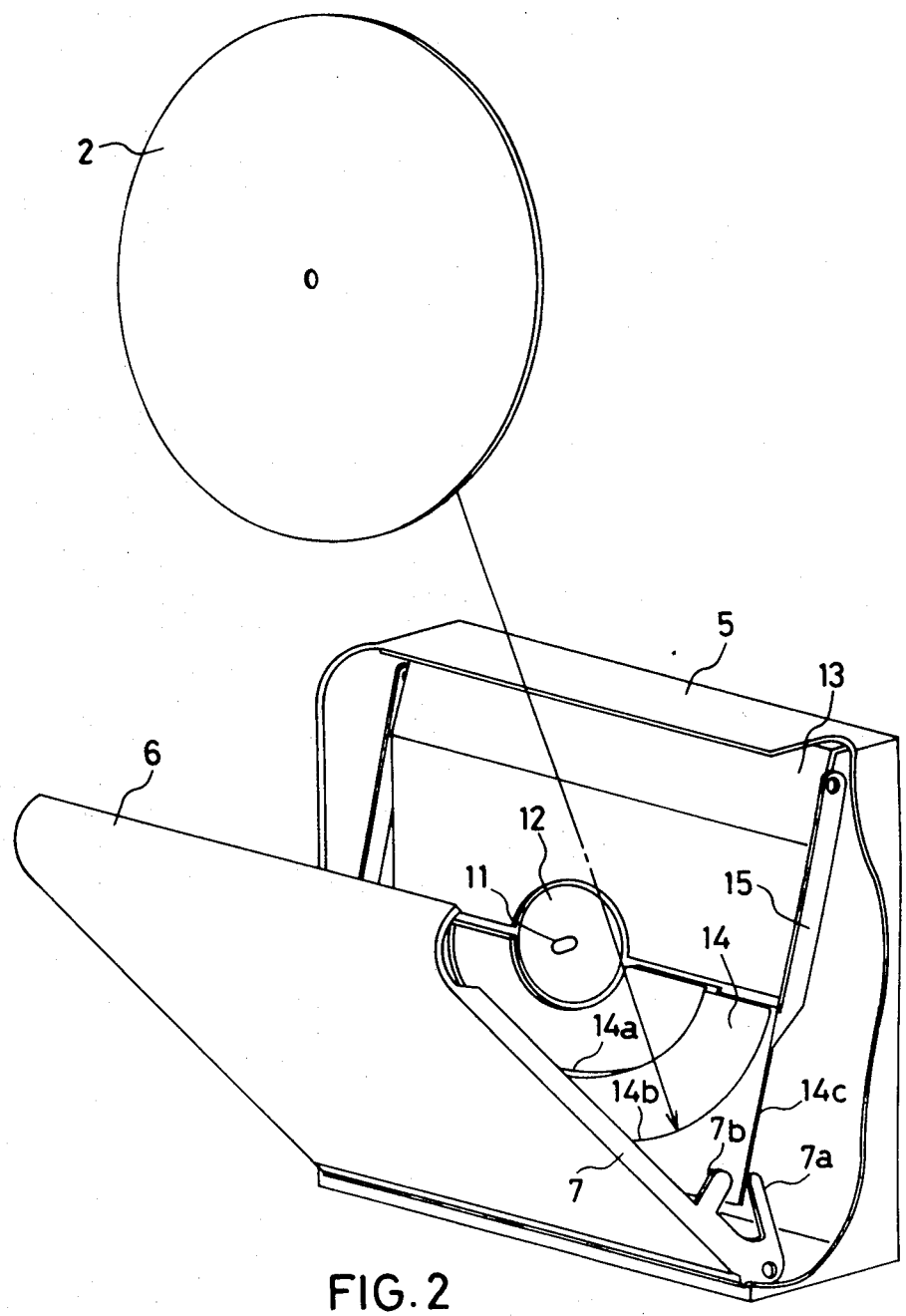
FIG. 2 is a cross-sectional perspective view of a record player constructed in accordance with an embodiment of the present invention.

Referring now to FIGS. 2 through 6, there is illustrated a specific embodiment of the present invention which is applied to a vertical disk player. As illustrated in a perspective view in FIG. 2 showing the appearance of the player, a front cover 6 is held rotatable about the bottom edge of a body 5 of the player by means of an arm 7 which includes a pair of protrusions 7a and 7b for sandwiching an edge portion 14c of a disk mount 14. The front cover 6 is also provided with a disk pressing member 8 and a pickup 9 (both are not shown in FIG. 2).

Disposed on the top surface of the body 5 of the player is an inner cover 13 which conceals components within the player from view and prevents the record disk 2 from dropping due to oscillation or shock during operation of the disk mount 14 as discussed in detail below.

Figure 3:
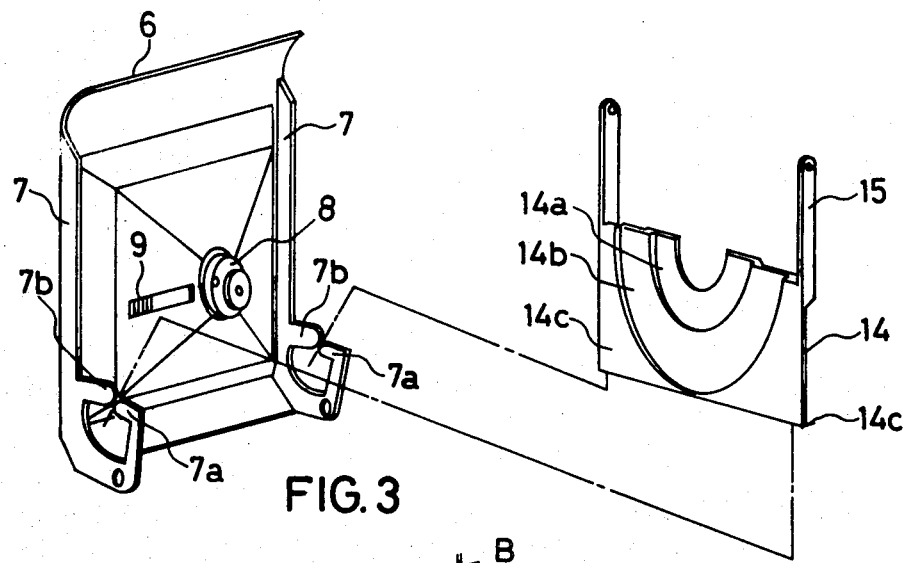
FIG. 3 is an exploded perspective view of a principal part of the illustrated embodiment.

The disk mount 14 is held rotatable on an upper portion of the body 5 of the player by use of an arm 15. The disk mount 14 includes an EP record disk mounting recess 14a and an LP record disk mounting recess 14b coaxial with respect to each other and being axially displaced on different levels. The edge portion 14c to be sandwiched by the protrusions 7a and 7b on the arm 7 is formed at opposite lower side edges of the disk mount 14 as illustrated in FIG. 3 which is a rear view of the cover 6.

Figure 4:
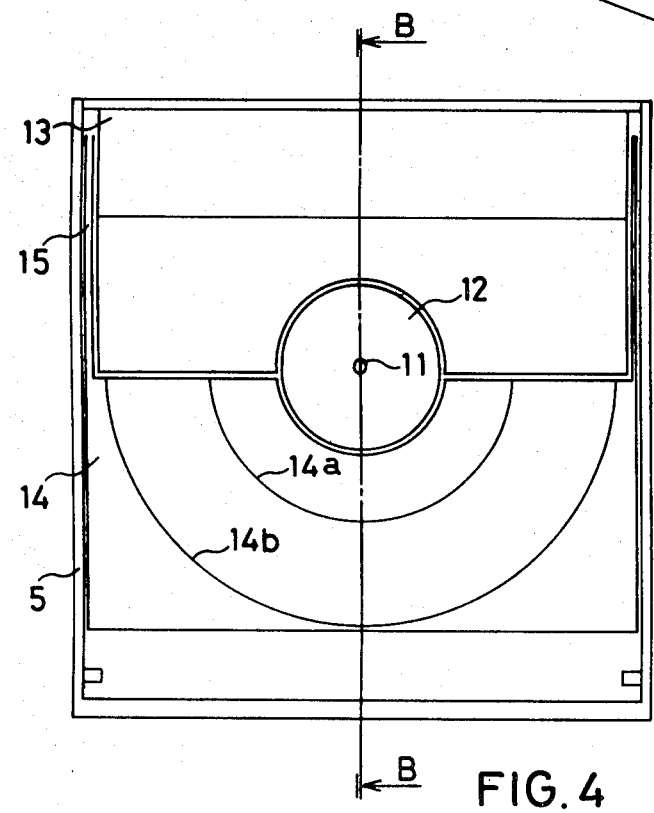
FIG. 4 is a front view of the illustrated embodiment with a front cover removed.

FIG. 4 is a front view of the player constructed in accordance with the present invention with the front cover 6 removed. Mounting and dismounting the record disk will now be described by reference to FIGS. 5 through 7 each a cross-sectional view along the line B—B in FIG. 4.

Figure 5:
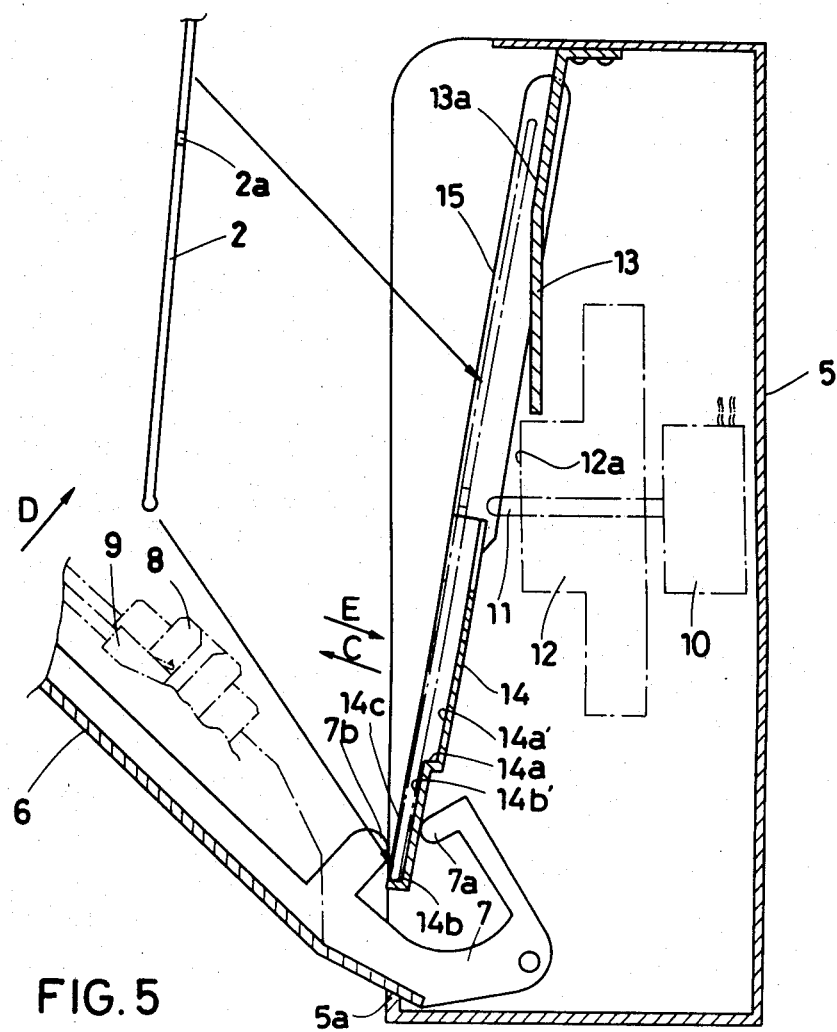
FIG. 5 is a partially cross-sectional view taken along the line B—B in FIG. 4 with the front cover in a full open position.
Figure 6:
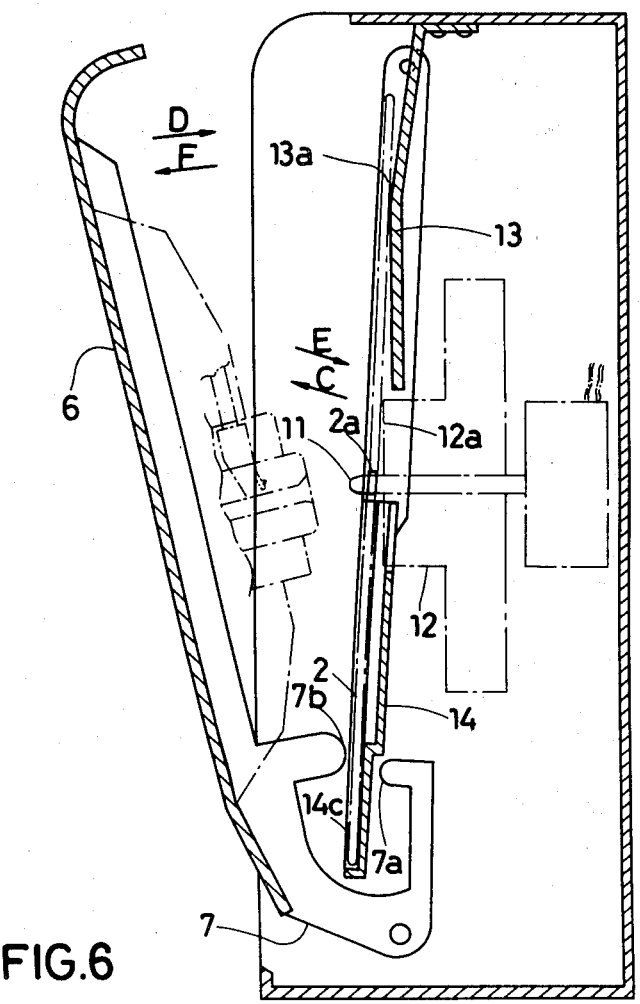
FIG. 6 is a partially cross-sectional view of the illustrated embodiment with the front cover in a half open position.

As seen from FIG. 5, when the front cover 6 is in the open position, the arm 7 is in contact with a lower side portion 5a of the body 5 of the player and is prevented from opening any further. For this reason the record disk mount 14, sandwiched at its edge portion 14c between the protrusions 7a and 7b of the arm 7, stands in a direction slightly inclined in the direction of the arrow C with respect to a vertical direction so that the EP record disk mounting recess 14a' and the LP record disk mounting recess 14b' are substantially aligned with a bearing surface 13a of the inner cover 13. Furthermore, the record disk mount 14 is placed so as not to interfere with the turntable 12 and the spindle 11.

Figure 7:
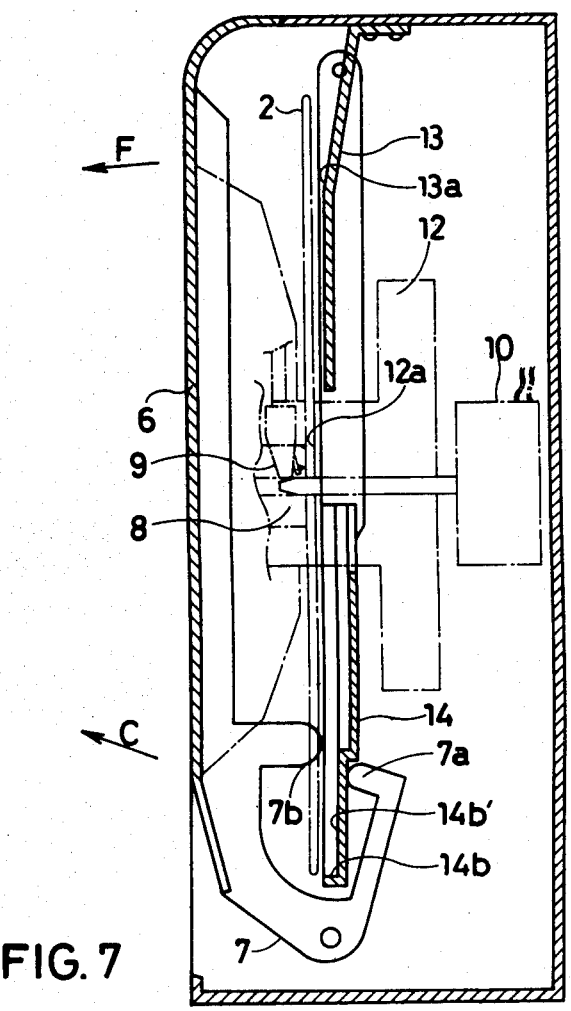
FIG. 7 is a partially cross-sectional view of the above embodiment with the front cover in a full open position.

To mount the record disk under these circumstances, the record disk 2 is placed on the disk mount 14 especially in the EP record disk mounting recess 14a or the LP record mounting recess 14b in the case of an EP record disk or an LP record disk, respectively. Then, the front cover 6 is rotated in its closing direction (namely, the direction of the arrow D). The following will set forth a description of the mounting of an LP record disk. With the closing movement of the front cover 6 the arm 7 is rotated in the direction of the arrow D so that the protrusion 7b pushes the edge portion 14c of the disk mount 14 and the disk mount 14 rotates in the direction of the arrow E together with the arm 15. As is clear from FIG. 6, the central opening 2a of the record disk 2 is fitted around the spindle 11 and the record disk 2 slightly abuts on an upper edge portion of a pressure surface of the turntable 12 and the bearing surface 13a of the inner cover 13. The disk 2 therefore will not drop off the disk mount 14 with ease due to oscillation or shock in opening the cover. When the front cover 6 is further rotated and the closing is completed as shown in FIG. 7, the front cover 6 is locked in this position by means of a locking assembly not shown so that the disk 2 is secured tightly under pressure on the pressure surface 12a of the turntable 2 by the pressing member 8 on the front cover 6 and spaced away from the bearing surface 13a of the inner cover 13. The disk 2 is disengages from the mounting recess 14b of the disk mount 14 standing in a normal direction under pressure from the protrusion 7b of the arm 7 and set free of any components other than rotation-driving members such as the turntable 12. Under these circumstances the disk 2 is driven by a motor 10 and the pickup 9 is operated to reproduce.

All that is necessary to remove the disk from the disk mounting condition shown in FIG. 7 is to rotate the front cover 6 in the opening direction as denoted by the arrow F. Upon rotation of the front cover 6 in the direction of the arrow F the pressing member 8 moves away from the record disk 2 and the pressure surface 12a of the turntable and the disk mount 14 begins rotating in the direction of the arrow C by pressing force of the protrusion 7a of the arm 7 so that the LP disk mounting recess 14b comes into engagement with the disk 2. If the front cover 6 is further rotated in the opening direction, then the disk 2 is under the influence of the rotating movement of the disk mount 14 so that the central opening 2a moves out of the spindle 11 and is free of the rotating-driving members including the turntable 12 and so forth. Under these circumstances the disk may be inserted or removed manually.

As stated previously, the present invention provides a disk mount assembly which includes the mount on which the disk is temporarily mounted in the neighborhood of the turntable, and means for operatively interlocking the mount with the front cover, the pressing member, etc. When the cover or the pressing member is in the open position, the disk mount is placed forwardly of the turntable to permit the mounting of the disk thereon. With the cover or the pressing member being in the closed position, the disk mount is moved backwardly of the turntable to permit tight engagement of the record with the turntable. Accordingly, the present invention eliminates the need for a procedure for fitting the central opening of the disk around the spindle and overcomes the dangerous situation wherein the disk may fall off the player especially in the vertical-moving disk player.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A disk mount assembly for use with a turntable having a spindle for positioning a playable disk on the turntable relative to a pickup comprising:

a housing having an open end for containing said turntable and said pickup;

a closure cover pivotally mounted relative to said housing and being adapted to close said open end; and a disk mount pivotally mounted relative to said housing and being disposed within the open end of said housing for selectively positioning a playable disk on said spindle for ensuring accurate positioning relative to said spindle;

said closure cover being pivotable in a first direction to an open position and in a second direction to a closed position, said cover includes protrusions engageable with said disk mount for imparting a pivoting rotation to said disk mount in said second direction to disengage a playable disk from said spindle as said closure cover is pivoted in said first direction to said open position and said protrusions imparting a pivoting rotation to said disk mount in said first direction to automatically accurately position a playable disk on said spindle as said closure cover is pivoted in said second direction to said closed position.

2. A disk mount assembly according to claim 1, said housing further including an inner cover being operatively disposed adjacent to said spindle for engaging and retaining a playable disk together with said disk mount as said closure cover is pivoted to the open position.

3. A disk mount assembly according to claim 1 wherein said disk mount includes an edge portion and said protrusions include at least two protrusions engageable on opposite sides of said edge portion of said disk mount.

4. A disk mount assembly according to claim 1, wherein said disk mount includes at least one recess for initially engaging a playable disk when said closure cover is in the open position.

5. A disk mount assembly according to claim 4, wherein said disk mount includes two recesses coaxially arranged and axially displaced on different levels with respect to each other.

6. A disk mount assembly according to claim 2, wherein said disk mount includes a lower portion for engaging a playable disk and arms which are pivotally mounted to said housing adjacent to said inner cover.

7. A disk mount assembly according to claim 1, and further including a disk pressing member operatively affixed to said closure cover for engaging a central portion of a playable disk for operatively securing the playable disk relative to said turntable, said spindle and said pickup.

8. A disk mount assembly according to claim 7, wherein said disk mount is disengaged from a playable disk when said closure cover member is in the closed position and said disk pressing member engages a central portion of the playable disk.

9. A disk mount assembly according to claim 1, wherein said turntable is mounted in a vertical direction.

* * * * *

UNITED STATES PATENT AND TRADEMARK OFFICE
CERTIFICATE OF CORRECTION

PATENT NO. : 4,403,317
DATED : September 6, 1983
INVENTOR(S) : SUZUKI et al

It is certified that error appears in the above-identified patent and that said Letters Patent are hereby corrected as shown below:

In the Heading of the Patent, in the category "Foreign Application Priority Data", delete "Apr. 22, 1981  [JP]   Japan..............56-2811" and insert --Apr. 22, 1980  [JP]   Japan..............56-2811

Apr. 22, 1980  [JP]   Japan..............55-55653[U]--.

Signed and Sealed this

Seventeenth Day of April 1984

[SEAL]

Attest:

GERALD J. MOSSINGHOFF

Attesting Officer      Commissioner of Patents and Trademarks